United States Patent [19]
Seki

[11] Patent Number: 5,128,512
[45] Date of Patent: Jul. 7, 1992

[54] LASER BEAM MACHINING DEVICE

[76] Inventor: Masahiro Seki, 2430 Ouazanagaba Nakanoguchi, Nishikanbaragun, Niigataken, Japan

[21] Appl. No.: 624,183

[22] Filed: Dec. 7, 1990

[30] Foreign Application Priority Data

Jul. 26, 1990 [JP] Japan ............... 2-79553[U]

[51] Int. Cl.$^5$ ............................................. B23K 26/02
[52] U.S. Cl. ............................................. 219/121.82
[58] Field of Search ................... 219/121.82, 121.32, 219/121.31, 121.6, 121.85

[56] References Cited

U.S. PATENT DOCUMENTS 4,760,237  7/1988  Mizukado et al. ............... 219/121.82
4,840,303  6/1989  Fujii et al. ...................... 219/121.82 X

FOREIGN PATENT DOCUMENTS 57-54952  11/1982  Japan .

Primary Examiner—C. L. Albritton
Attorney, Agent, or Firm—Eckert Seamans Cherin & Mellott

[57] ABSTRACT

A laser beam machining device has a working head with a laser beam irradiation part, and a movable table for setting an iron plate or a work. On the upper surface of said movable table, driving rollers such as iron rollers are provided in parallel to each other, and said movable table has on its either side a cramp device for fixing a setting plate for setting said iron plate or work. The provision of said driving rollers on the upper surface of said movable table enables the automatic carrying in of said iron plate or work, and its carrying out together with the product by the driving rollers, contributing to the labor saving.

8 Claims, 4 Drawing Sheets

LASER BEAM MACHINING DEVICE

FIELD OF THE INVENTION

This invention relates to a laser beam machining device for processing a work with laser beams.

BACKGROUND OF THE INVENTION

In the past, a device for machining a work with laser beams with the work being fixed on a movable table have been proposed in Japanese Utility Model Publication No. 57-54952 and the like. Such laser beam machining device has needle work support parts on the movable table, a work laid on and fixed to the work support parts is irradiated with laser beams from a working head and machined, and the resulting comparatively small product is dropped between the support parts onto a conveyor and the like laterally provided under the movable table and carried thereby, while the comparatively large product remains laid on the work support parts and taken out by a worker after completion of the processing.

The conventional technology mentioned above requires the use of cranes to carry in the work and the disposition of a worker every laser beam machine or every several machines to take out the processed comparatively large product supported by the work support parts, and labor saving could not be achieved.

Particularly, the operation of the laser beam machining device for 24 hours is attended with midnight works, and the more labor saving has been desired.

SUMMARY OF THE INVENTION

It is, accordingly, an object of the present invention to provide a laser beam maching device, whereby the conventional problems are solved and the labor saving can be achieved.

The device according to the present invention comprises a plurality of driving rollers horizontally arranged in parallel to each other on the upper surface of a table horizontally provided in opposition to a working head, a work supporting setting plate provided on the driving rollers, and a stopper capable of engagingly locking the edge part of the work provided on the edge part of the setting plate.

According to the above constitution, the work can be set on the setting plate in the state locked by the stopper, and carried onto and out from the table together with the setting plate by the driving rollers.

BRIEF DESCRIPTION OF THE DRAWINGS

FIGS. 1-5 show a first embodiment of the present invention, in which;

FIG. 1 is a front view of the same;

FIG. 2 is a sectional view of the essence thereof;

FIG. 3 is a perspective view of the whole device;

FIG. 4 is a perspective view of the essence thereof; and

FIG. 5 is a plane view illustrating the arrangement state;

DESCRIPTION OF PREFERRED EMBODIMENTS

Figure 1:
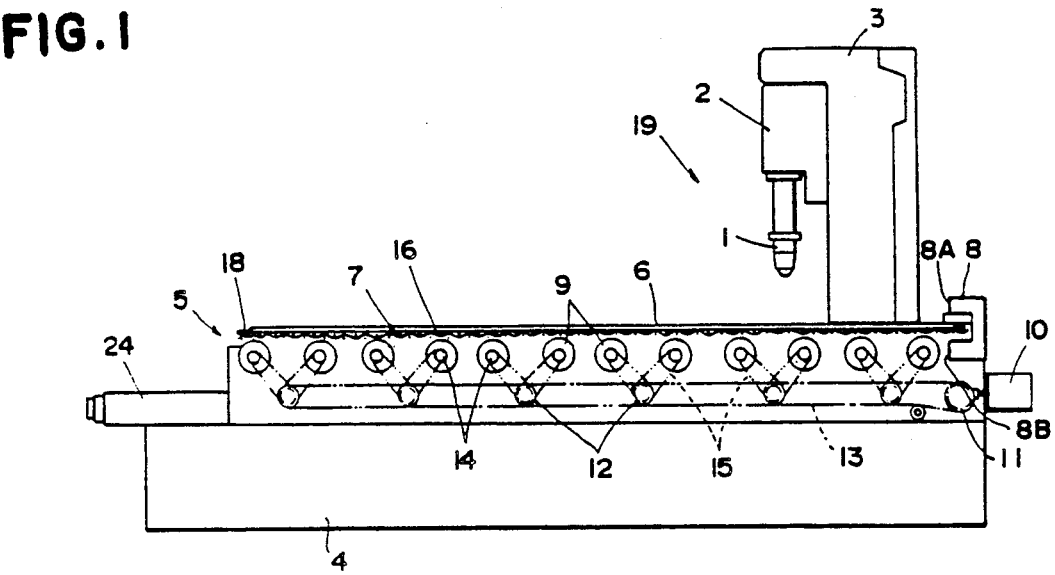
Figure 2:
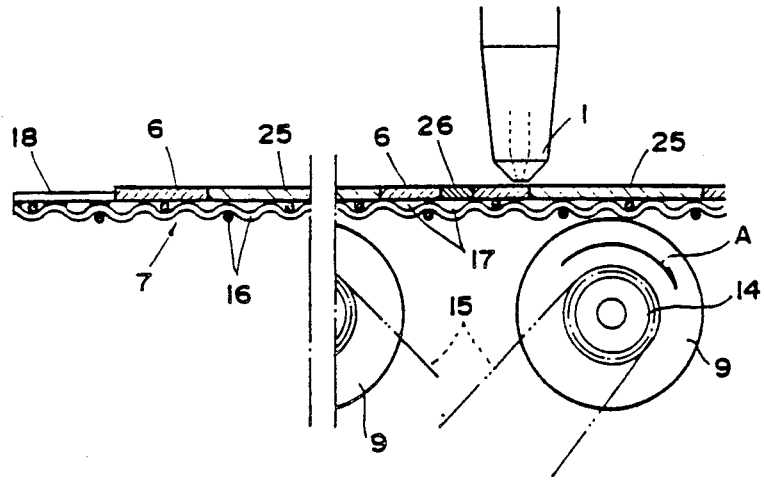
Figure 3:
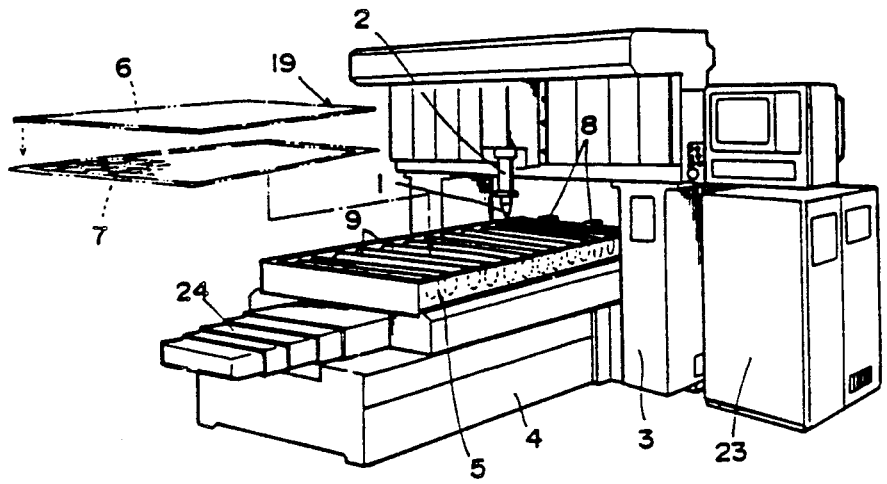
Figure 4:
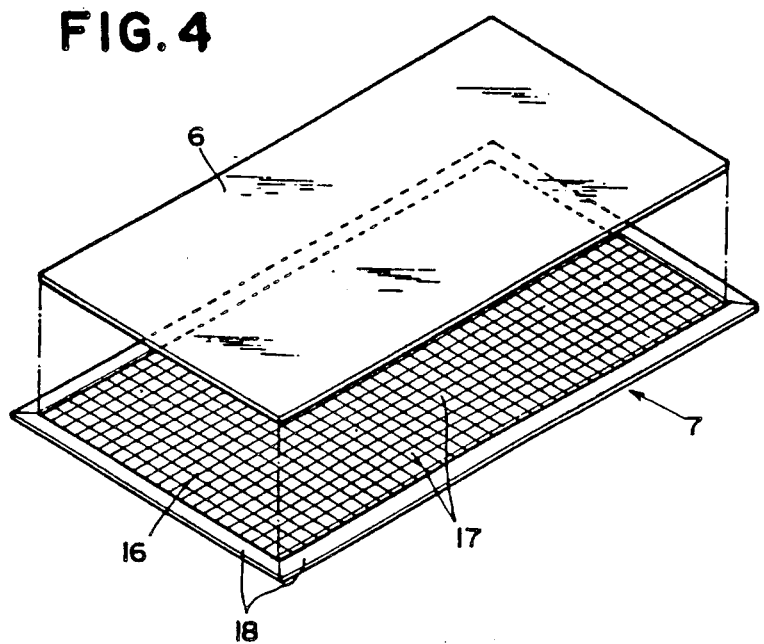
Figure 5:
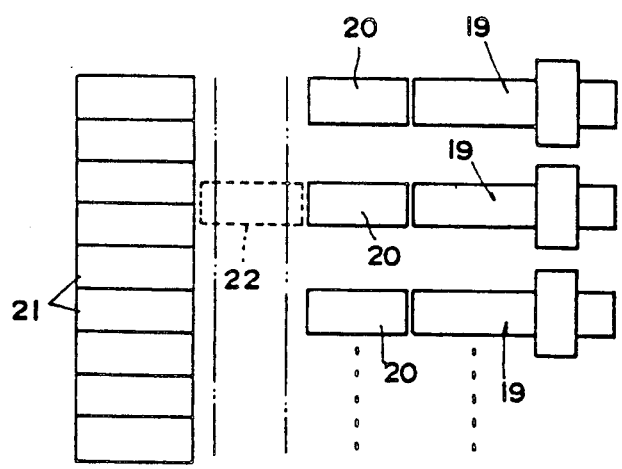

The preferred embodiments of the present invention are further illustrated in reference to the attached drawings.

In FIGS. 1-5 showing the first embodiment of the invention, a working head 2 having a well-known laser beam irradiation part 1 is provided laterally and longitudinally movably on a gate frame 3 as an upper frame, which frame 3 has a base 4 in its lower part, and a movable table 5 is longitudinally movably provided on the base 4 in opposition to the working head 2. The movable table 5 has on its either side a cramp device 8 for fixing a setting plate 7 for setting an iron plate 6 or a work by means of an air cylinder (not shown), etc. The cramp device 8 can fix a frame plate described later by closing a vertical pair of support bodies 8A, 8B by the air cylinder. On the upper surface of the movable table 5, driving rollers 9 such as iron rollers are provided in parallel to each other, with the shaft cores of the driving rollers 9 crossing the moving direction of the movable table 5 at a the right angle, and also the driving rollers 9 can be rotated positively and reversely by a motor 10 provided on one side of the movable table 5. Namely, a first driving sprocket 11 is fixed to the motor shaft of the motor 10 provided on the moving table 5 through a decelerator (not shown), and a plurality of first driven sprockets 12 are disposed in a row under the driving rollers 9, with a first chain 13 being suspended between these first driving sprockets 11 and the first driven sprocket 12, and also second driven sprockets 14 are fixed to the shaft end of each driving roller 9, with second chains 15 being suspended between the second driven sprockets 14 and second driving sprockets (not shown) provided concentrically with the first driven sprockets 12, so that the driving rollers 9 can be rotated positively and reversely by the rotating force of the motor 10. The setting plate 7 has a plate form made by netting wavy linear materials of iron as a mesh linear material, and a number of holes 17 are formed thereon. A frame plate 18 such as iron plate which is a stopper engagingly locking and enclosing the iron plate 6 is fixed to the upper surface edge part of the setting plate 7.

A known stocker 20 having the setting plates 7 loaded with the iron plates 6 in multiple stages is provided on the other side of the laser beam machining device 19 in such a manner as to be capable of going up and down by means of a hydraulic cylinder (not shown), and also the stocker 20 has a feed device (not shown) for feeding the received setting plates 7 one by one to the driving roller 9 side. On the other side of the stocker 20, a known cubic store house 21 is provided to receive a plurality of stockers 20, which can be carried in and out to a determined position by an automatic dolly 22. Denoted at 23 is a control board, 24 is a known carrying device such as conveyor provided on the base 4, in which each stepped part 24A, 24B, 24C is extended and contracted to move a product (not shown) on the respective upper surface from the upper step part 24C to the lower step part 24A side and finally fall down the product from the part 24A.

The description is now directed to the action of the above-said constitution.

The iron plate 6 is set on the setting plate 7 with being preliminarily locked by the inner edges of the frame plate 18 and stored in multiple stages in the stocker 20, which stocker 20 is received in the cubic store house 21. After the stocker 20 pulled out by the automatic dolly 22 is moved to the side of the laser beam machining device 19, the iron plate 6 is pulled out from the stocker 20 onto the movable table 5 together with the setting plate 7, and also the driving rollers 9 are driven and rotated in the arrowed direction A by the motor 10, whereby the setting plate 7 is carried in the direction of the cramp device 8 to bring the frame plate 18 into contact with the cramp device 8, by which the frame plate 18 is fixed and positioned. Thereafter, with laterally moving the working head 2 by a known driving device (not shown) and longitudinally moving the movable table 5 by the similar known driving device (not shown), based on the data preliminarily inputted by the control board 23, the iron plate 6 is irradiated with laser beams from the irradiation part 1 facing the iron plate 6, whereby cutting work is carried out. A cut out product 25 larger than the hole 17 is supported on the setting plate 7, while a product 26 smaller than the hole 17 is passed between the hole 17 and the driving rollers 9 and fallen onto the carrying device 24 to recover the product 26 as described above. Thus, after completion of the machining with laser beams, the cramp device 8 is opened to release the fixed state, and the driving rollers 9 are reversely rotated by the motor 10 to carry the setting plate 7 into the stocker 20 together with the product 25 and the residual iron plate 6, whereby one stroke is finished. Thereafter, the stocker 20 is raised and lowered to feed out the placing plate 7 in another stage together with the iron plate 6 onto the driving rollers 9 to conduct the machining. Thus, after all the iron plates 6 received in the stocker 20 are machined, the stocker 20 is stored in the store house 21 by the automatic dolly 22, and a new stocker 20 is carried out to repeat the machining.

In the above embodiment, the provision of the driving rollers 9 on the upper surface of the movable table 5 enables the automatic carrying in of the iron plate 6 and its carrying out together with the product 25 by the driving rollers 9, contributing to the labor saving.

As the iron plate 6 is worked in the state set on the setting plate 7 having a plurality of holes 17 formed thereon, there is no possibility of inclination of the products 25, 26 during cutting, and the cutting work can be carried out with highly dimensional accuracy.

The frame plate 18 capable of engagingly locking the edge part of the iron plate 6 is provided on the edge part of the setting plate 7, whereby the iron plate 6 can be positioned and fixed by this frame plate 18, disposed in a determined position of the movable table 5, and prevented from slipping down during the movement, providing the certain carrying in and out and machining. Further, the setting plate 7 can be reinforced by the frame plate 18.

Figure 6:
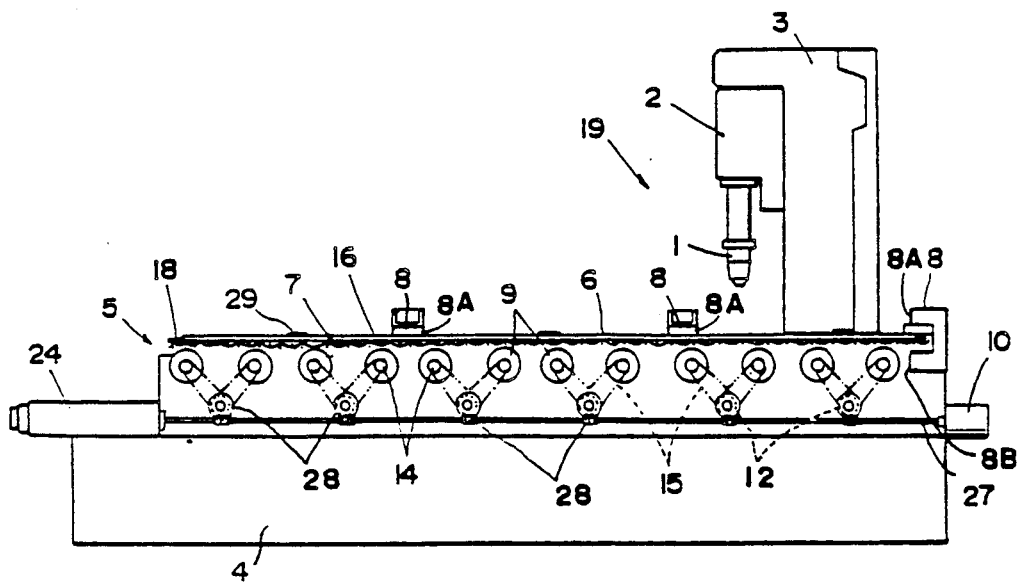
FIG. 6 is a front view illustrating a second embodiment of this invention.
Figure 7:
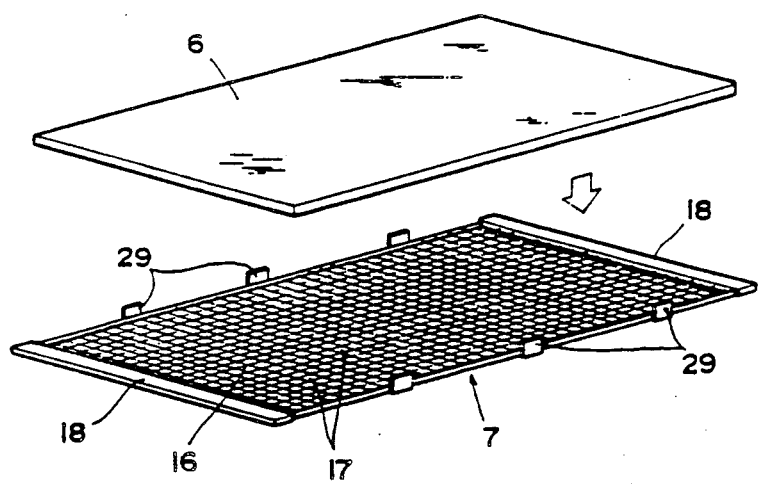
FIG. 7 is a perspective view of the essence of the same.

In FIGS. 6 and 7 showing a second embodiment of the present invention, like reference characters denote like parts as in the first embodiment to omit the detailed description.

In the second embodiment, a rotating shaft 27 is connected to the motor shaft of the motor 10 self-containing a decelerating device (not shown) fixed to either side of the movable table 5, and the first driven sprocket 12 concentric with the rotating shaft 27 is driven through, for example, a worm such as worm wheel 28 to transmit the rotating force of the motor 10 to the driving rollers 9. The setting plate 7 has the frame plates 18 on the both sides and protruded stoppers 29 in the longitudinal direction, and also the cramp device 8 is provided in the longitudinal direction of the movable table 5.

Thus, the iron plate 6 can be engagingly locked by the frame plates 18 and the stoppers 29 into the holding state and fixed by the cramp device 8.

Figure 8:
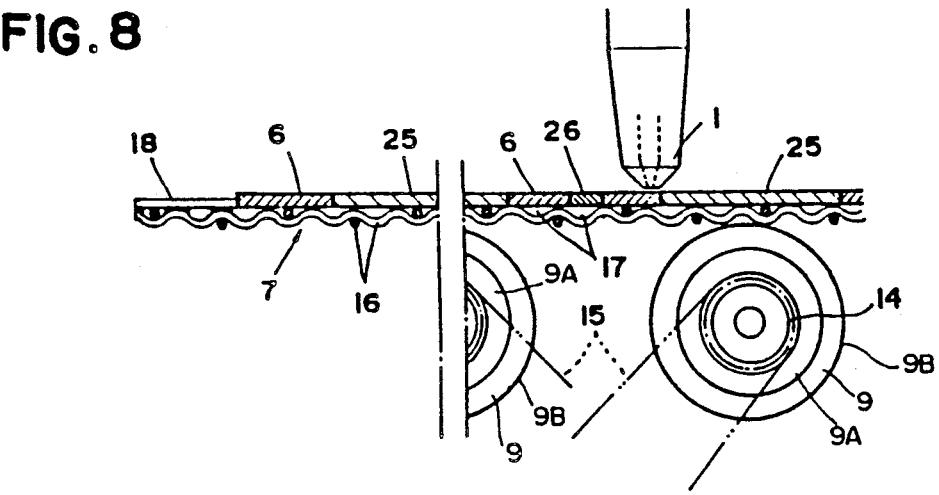
FIG. 8 is a perspective view of a third embodiment of the present invention.
Figure 9:
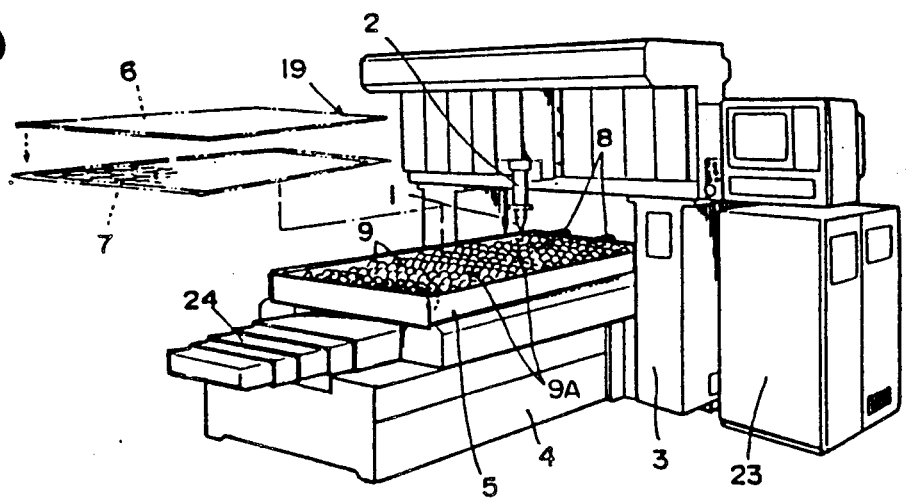
FIG. 9 is a sectional view of the essence of the same.
Figure 10:
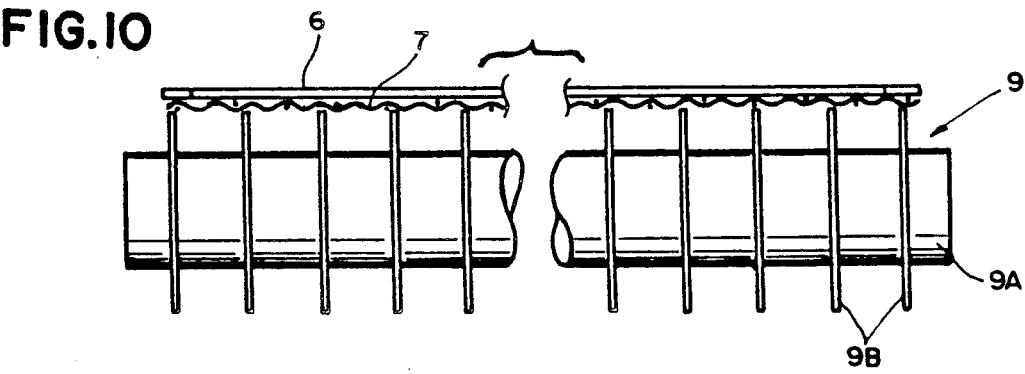
FIG. 10 is a side view of a driving roller of the third embodiment.

In FIGS. 8-10 showing a third embodiment of the present invention, like reference characters denote like parts as in the first embodiment to omit the detailed description.

In the third embodiment, each of the driving rollers 9 is formed of a small iron roller 9A and disks 9B, the respective small rollers 9A are provided in parallel to each other, and the disks 9B are fixed to the small roller 9A in parallel to each other. The small iron rollers 9A with disks are driven, whereby a setting plate 7 on the disks is carried in the direction of the cramp device 8 to bring the frame plate 18 into contact with the cramp device 8. The iron plate 6 is irradiated with laser beams from the irradiation part 1 facing the iron plate 6, and the laser beams by the laser beam irradiation part 1 go through not only the iron plate 6 but also the gap of the disks. As the driving roller 9 is formed of the small iron roller 9A and disks, the iron plate 6 or work is irradiated with and cut by laser beams efficiently.

This invention is never limited by these embodiments as described above, and the parallel arrangement of free rollers freely rotatable together with the driving rollers, or the respective connection of motors to driving rollers may be adapted, although the driving rollers are provided on the movable table in the embodiments. Further, various modifications such as a fixed table with a longitudinally movable gate frame can be carried out, instead of the movable type table shown in the embodiments.

The device of the prevent invention has a working head having a laser beam irradiation part provided on an upper frame, a table provided horizontally in opposition to the working head, driving rollers provided in parallel to each other on the upper surface of the table, a work supporting setting plate having a plurality of holes formed thereon which is provided on the driving rollers in such a manner as to be capable of setting thereon, and a stopper capable of engagingly locking the edge part of the work provided on the edge part of the setting plate, and by providing the driving rollers on the movable table, the setting plate having holes formed thereon can be carried onto the table in the state where the work is set on the setting plate and positioned by the stopper, and carried out together with the resulting product. Thus, the carrying in of the work and the carrying out of the product can be automized to save the labor, and further precise machining can be conducted as the work is machined in the state set on the setting plate.

I claim:

1. A laser beam machining device comprising a working head having a laser beam irradiation part on an upper frame, a table provided in opposition to the working head, and a plurality of driving rollers provided in parallel to each other on an upper surface of the table.

2. A laser beam machining device according to claim 1 wherein a work supporting setting plate having a plurality of holes formed thereon and loaded with a work is removably and attachably provided on the driving rollers.

3. A laser beam machining device according to claim 1 wherein the driving rollers are driven by a motor.

4. A laser beam machining device according to claim 1 wherein a cramp device capable of fixing a work supporting setting plate is provided on an end part of the table.

5. A laser beam machining device according to claim 2 wherein the work supporting setting plate has a stopper for engagingly locking the work in the outside of a mesh linear material provided in the inside.

6. A laser beam machining device according to claim 1 wherein the driving roller is formed of a small roller and disks fixed to said small roller.

7. A laser beam machining device according to claim 5 wherein the stopper is a frame plate fixed to the outside of the mesh linear material.

8. A laser beam machining device according to claim 4 wherein the cramp device supports the frame plate.

* * * * *